United States Patent
Corrigan et al.

(10) Patent No.: US 8,141,089 B2
(45) Date of Patent: Mar. 20, 2012

(54) METHOD AND APPARATUS FOR REDUCING CONTENTION FOR COMPUTER SYSTEM RESOURCES USING SOFT LOCKS

(75) Inventors: Michael J. Corrigan, Rochester, MN (US); Gary Ross Ricard, Chatfield, MN (US); Timothy Joseph Torzewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1468 days.

(21) Appl. No.: 11/622,021

(22) Filed: Jan. 11, 2007

(65) Prior Publication Data

US 2008/0172670 A1    Jul. 17, 2008

(51) Int. Cl.
*G06F 9/46* (2006.01)

(52) U.S. Cl. ........ 718/104; 718/100; 718/101; 718/102; 718/107

(58) Field of Classification Search .................. 718/104, 718/102, 100, 107, 101
See application file for complete search history.

(56) References Cited

U.S. PATENT DOCUMENTS

| | | | |
|---|---|---|---|
| 6,801,543 B1 * | 10/2004 | Ployer | 370/468 |
| 2002/0010610 A1 * | 1/2002 | Jacobs et al. | 705/8 |
| 2003/0023724 A1 * | 1/2003 | Martin et al. | 709/225 |
| 2007/0021998 A1 * | 1/2007 | Laithwaite et al. | 705/9 |
| 2007/0050779 A1 * | 3/2007 | Hayashi | 718/108 |

* cited by examiner

*Primary Examiner* — Emerson Puente
*Assistant Examiner* — Willy W Huaracha
(74) *Attorney, Agent, or Firm* — Roy W. Truelson (57) ABSTRACT

A soft lock mechanism controls access by multiple processes to a shared resource to make simultaneous access an unlikely event, while not necessarily preventing simultaneous access. Preferably, the soft lock contains a next_free_time field, specifying when the soft lock will next be available, and a lock_duration, specifying a sufficiently long interval for most accesses to the resource to complete. The lock is obtained by comparing the current time to next_free_time. If the current time is later than next_free_time, then the lock is obtained immediately, and next_free_time is updated to the current time plus lock_duration. If the current time is before next_free_time, then next_free_time is incremented by lock_duration, and the requesting process waits until the old next_free_time to obtain the lock. No action is required to release the lock.

17 Claims, 5 Drawing Sheets

METHOD AND APPARATUS FOR REDUCING CONTENTION FOR COMPUTER SYSTEM RESOURCES USING SOFT LOCKS

FIELD OF THE INVENTION

The present invention relates to digital data processing, and in particular to methods and apparatus for sharing resources among multiple software processes.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which form a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software with enhanced function, along with faster hardware.

Almost all modern general purpose computer systems support some form of multi-tasking, in which multiple processes are simultaneously active, and computer system resources, particularly processor resources, are allocated among the different processes. Multi-tasking supports a more efficient use of the various hardware resources by enabling a resource which is temporarily not needed by one process to be used by a different process. Multi-tasking thus increases overall throughput, i.e., overall work performed in a given time.

Multi-tasking inevitably causes contention among the active processes for certain resources. As the number of active processes increases to more fully utilize key resources, this contention becomes more serious. Eventually, the number of active processes can become so large that contention for resources begins to adversely affect performance. In other words, at some point the addition of more active processes will degrade throughput, because the benefit of increased resource utilization is outweighed by the increased contention these additional processes entail.

Resources which are shared by active processes can be either hardware resources (processors, memory space, etc.) or software resources (shared data structures, shared code paths). There are certain resources which, by their nature, are capable of being utilized by multiple processes simultaneously, but which are heavily optimized to operate more efficiently when utilized by a single process at a time. In particular, executable code is generally available for use by multiple processes simultaneously, but there are certain code paths which result in much faster execution if only one process or thread is executing in the code path at any given time.

In such a situation, it would be possible to regulate access to the resource by use of a lock. A lock is a software mechanism by which a single process is granted the exclusive temporary use of a resource, and when finished relinquishes the lock so that the resource may be used by other processes. A lock therefore guarantees that only one process can utilize the resource at a time. However, the granting and relinquishing of locks itself involves considerable overhead. For this reason, locks are typically used only to regulate access to resources which can not be simultaneously accessed, e.g., where simultaneous access could compromise data integrity.

It would be desirable to reduce contention of multiple processes for shared resources, and particularly for software resources, without the high overhead associated with conventional lock mechanisms.

SUMMARY OF THE INVENTION

A soft lock mechanism for a shared computer system resource controls access by multiple processes to a shared resource to make simultaneous access an unlikely event, while not necessarily making simultaneous access impossible. Preferably, the soft lock limits the grant of access within a time interval after a previous grant, the time interval calculated to make simultaneous access unlikely. Expiration of the time interval allows a soft lock to be granted to another process, without requiring explicit release of the soft lock by a previous process.

In the preferred embodiment, a soft lock contains a next_free_time field, specifying the earliest time at which the soft lock will be available, and a lock_duration, specifying a time interval assumed to be sufficiently long for most processes to finish using the resource. The lock is obtained for a requesting process by comparing the current time to next_free_time. If the current time is later than next free time, then the lock is granted immediately, and next_free_time is updated to the current time plus lock_duration. If the current time is before next_free_time, then next_free_time is updated to next_free_time plus lock_duration, and the requesting process waits until the old next_free_time to obtain the lock. No action is required to release the lock.

By providing a relatively low overhead "soft lock" mechanism, it is feasible to provide locks for certain resources to reduce contention which might adversely affect performance. Overhead is reduced because no action is required to release a soft lock once a process has finished using the shared resource. The low overhead soft lock does not guarantee the elimination of all contention, since it is possible that a first process given the lock will not be finished with the resource before a second process starts. However, it makes contention a much less frequent event. Such a "soft lock" is therefore a useful tool for controlling access to certain resources, where simultaneous access would not compromise system integrity, but would have a significant adverse effect on performance.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

The general subject of the present application is the sharing of resources among multiple active processes, tasks, jobs, threads or similar constructs in a multi-tasking system. In general, a task or job is an executing instance of a computer program or function on behalf a particular user, having its own state. A task or job may contain a single thread of execution, or may spawn multiple threads. Different computer system architectures use different terms to describe similar concepts, and there are sometimes subtle distinctions between the usage of these terms. Access rights to a resource may be granted to tasks or jobs, or may be granted to threads, depending on the system architecture, type of resource, and other factors. As used in the present application, a "process" includes any or all of the above or similar constructs to which access to a shared resource may be granted or from which it may be withheld.

Figure 1:
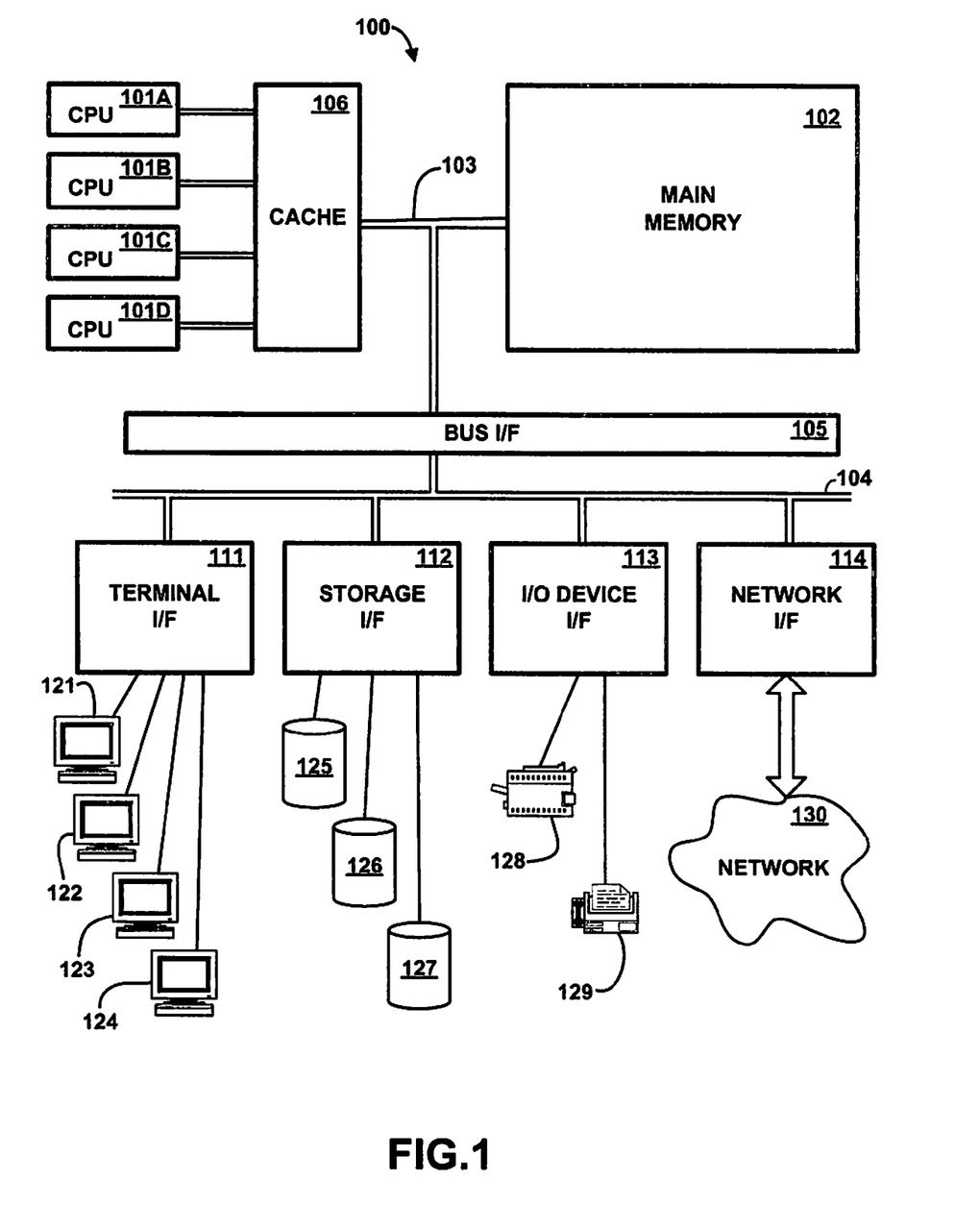
FIG. 1 is a high-level block diagram of the major hardware components of a computer system which uses a soft lock for controlling access to at least one resource, according to the preferred embodiment of the present invention.

Referring to the Drawing, wherein like numbers denote like parts throughout the several views, FIG. 1 is a high-level representation of the major hardware components of a computer system 100 which uses a "soft lock" mechanism for controlling access to at least one resource, according to the preferred embodiment. The major components of computer system 100 include one or more central processing units (CPU) 101A-101D, main memory 102, cache memory 106, terminal interface 111, storage interface 112, I/O device interface 113, and communications/network interfaces 114, all of which are coupled for inter-component communication via buses 103, 104 and bus interface 105.

System 100 contains one or more general-purpose programmable central processing units (CPUs) 101A-101D, herein generically referred to as feature 101. In the preferred embodiment, system 100 contains multiple processors typical of a relatively large system; however, system 100 could alternatively be a single CPU system. Each processor 101 executes instruction stored in memory 102. Instructions and other data are loaded into cache memory 106 from main memory 102 for processing. Main memory 102 is a random-access semiconductor memory for storing data, including programs. Although main memory 102 and cache 106 are represented conceptually in FIG. 1 as single entities, it will be understood that in fact these are more complex, and in particular, that cache may exist at multiple different levels, as is known in the art.

Buses 103-105 provide communication paths among the various system components. Memory bus 103 provides a data communication path for transferring data among CPUs 101 and caches 106, main memory 102 and I/O bus interface unit 105. I/O bus interface 105 is further coupled to system I/O bus 104 for transferring data to and from various I/O units. I/O bus interface 105 communicates with multiple I/O interface units 111-114, which are also known as I/O processors (IOPs) or I/O adapters (IOAs), through system I/O bus 104. System I/O bus may be, e.g., an industry standard PCI bus, or any other appropriate bus technology.

I/O interface units 111-114 support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O and other device interface 113 provides an interface to any of various other input/output devices or devices of other types. Two such devices, printer 128 and fax machine 129, are shown in the exemplary embodiment of FIG. 1, it being understood that many other such devices may exist, which may be of differing types. Network interface 114 provides one or more communications paths from system 100 to other digital devices and computer systems; such paths may include, e.g., one or more networks 130 such as the Internet, local area networks, or other networks, or may include remote device communication lines, wireless connections, and so forth.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary. It will further be understood that not all components shown in FIG. 1 may be present in a particular computer system. Several particular examples of such additional complexity or additional variations are disclosed herein, it being understood that these are by way of example only and are not necessarily the only such variations.

Although memory bus 103 is shown in FIG. 1 as a relatively simple, single bus structure providing a direct communication path among cache 106, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Main memory 102 is shown in FIG. 1 as a single monolithic entity, but it will be understood that main memory may have a more complex structure. For example, main memory may be distributed and associated with different CPUs or sets of CPUs, as is known in any of various so-called non-uniform memory access (NUMA) computer architectures, or may be divided into discrete subsets for access by separate buses which collectively comprise memory bus 103, or may form some other architecture. Similarly, although cache is shown as a single entity, there may be multiple hierarchical levels of caches, some of which may be shared by all or some of CPUs 101A-101D, and some of which may be dedicated for use of single respective CPUs. Furthermore, caches may be divided by function, so that one cache holds instructions while another holds non-instruction data which is used by the processor or processors.

Computer system 100 depicted in FIG. 1 has multiple attached terminals 121-124, such as might be typical of a multi-user "mainframe" computer system. Typically, in such a case the actual number of attached devices is greater than those shown in FIG. 1. Although contention tends to be a more serious concern in relatively large multi-user systems, the present invention is not limited to systems of any particular size. Computer system 100 may alternatively be a single-user system, typically containing only a single user display and keyboard input, or might be a server or similar device which has little or no direct user interface, but receives requests from other computer systems (clients).

While various system components have been described and shown at a high level, it should be understood that a typical computer system contains many other components not shown, which are not essential to an understanding of the present invention. In the preferred embodiment, computer system 100 is a computer system based on the IBM i/Series™ architecture, it being understood that the present invention could be implemented on other computer systems.

Figure 2:
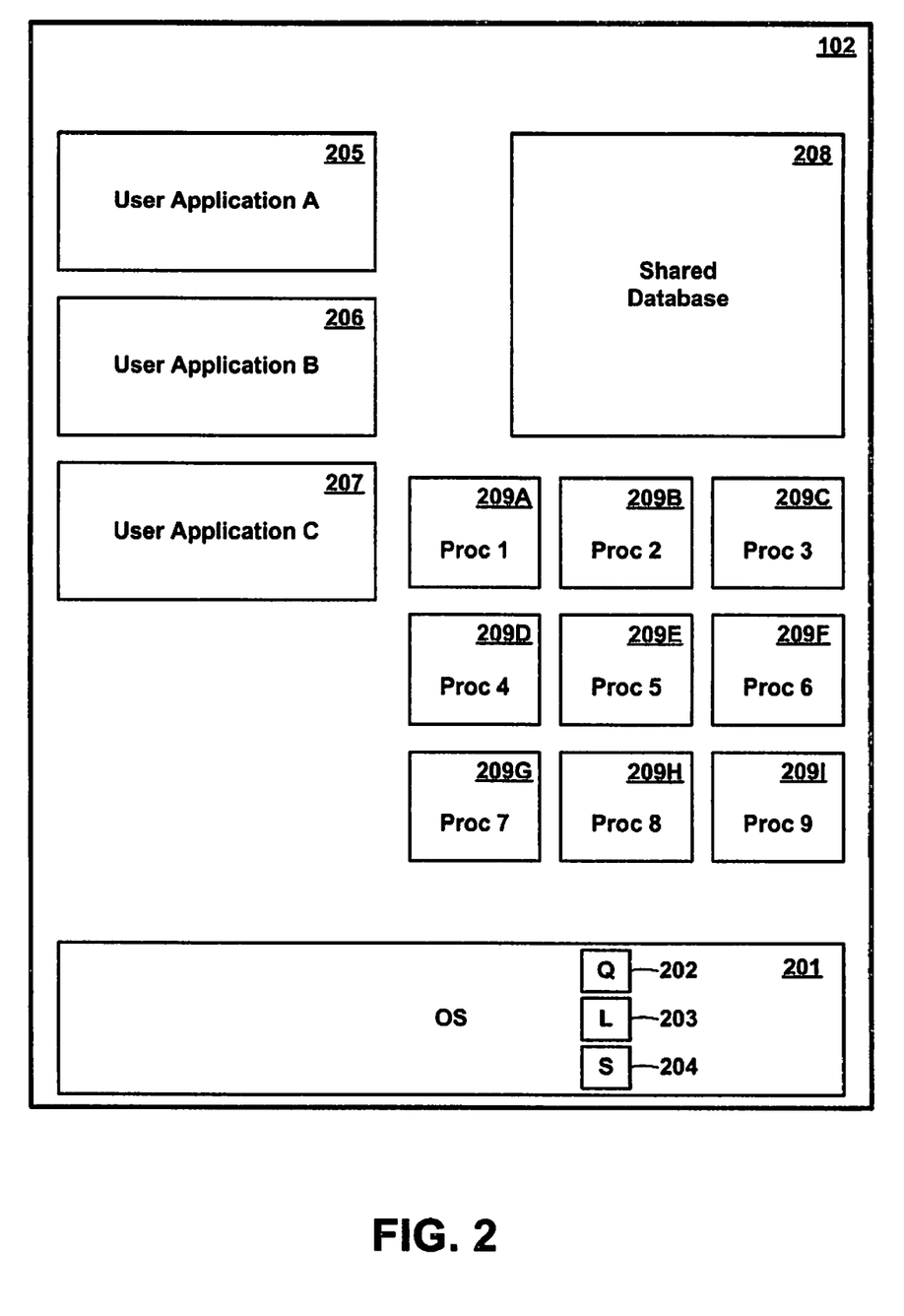
FIG. 2 is a conceptual illustration of the major software components of a computer system which uses a soft lock for controlling access to at least one resource, according to the preferred embodiment.

FIG. 2 is a conceptual illustration of the major software components of system 100 in memory 102. Operating system 201 is executable computer program code providing various low-level software functions, such as device interfaces, management of memory pages, etc. In particular, operating system 201 is a multi-tasking operating system which supports the concurrent execution of multiple active tasks and the sharing of system resources among those tasks, as is well-known in the art. Tasks are dispatched to respective processors for execution from at least one dispatch queue 202, execute until some event causes them to stop, and are either returned to queue 202 or placed in a wait state to wait for some relatively long latency event (such as a disk drive access).

For any of various reasons, it may be undesirable for two active processes to access or use some particular shared resource simultaneously. Operating system 201 may include any of various lock mechanisms 203 to control access to a shared resource, as are known in the art. One such lock mechanism is shown by example in FIG. 2, it being understood that a system typically has considerably more than one. A lock mechanism is a device which temporarily grants exclusive access to some resource to a single active process, preventing any other process from accessing or using the resource while the lock is held.

In the preferred embodiment, operating system 201 further includes at least one soft lock mechanism 204, one such mechanism being shown for illustrative purposes in FIG. 2. Soft lock mechanism 204 is also used for to control access to a shared resource, but unlike conventional lock mechanism 203, soft lock mechanism does not guarantee exclusive access to the shared resource. It merely makes it unlikely that another process will be able to access the shared resource. Soft lock 204 is therefore inappropriate for controlling access where simultaneous access must be absolutely prohibited, e.g., where simultaneous access to a resource could jeopardize data integrity. Soft lock 204 is preferably used to control access to certain resources where simultaneous access may cause significant performance degradation, but does not affect security, data integrity, or similar critical system attributes. The operation of soft lock mechanism 204 is described in greater detail herein. Although described herein and represented in FIG. 2 as part of operating system 201, soft lock 204 could be a separate software mechanism or could be part of some other shared software resource, such as database 208.

Software components of system 100 may further include one or more user application computer programs 205-207, of which three are shown for illustrative purposes in FIG. 2, it being understood that this number may vary, and is often much larger. User applications 205-207 may include any of various applications, now known or hereafter developed, for performing useful work on a computer system, such as accounting, word processing, web browsing, calendaring, computer program code development, process control, etc. One or more of user applications 205-207 may access an external database of shared data 208, and a shared resource could include database 208 or selective functions or data of database 208.

System 100 maintains separate process state data 209A-I for each of multiple active processes (herein referred to generically as feature 209). Process state data may include, e.g., a process identifier, a user identifier, a call-return stack, access rights, and any other required data which is unique to the process.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 2, it will be understood that the actual number of such entities may vary, and in particular, that in a complex code digital data processing environment, the number and complexity of such entities is typically much larger. Additionally, although software components 201-209 are depicted in FIG. 2 on a single computer system 100 for completeness of the representation, it is not necessarily true that all programs, functions and data will be present on a single computer system or will be performed on a single computer system.

While the software components of FIG. 2 are shown conceptually as residing in memory 102, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. Furthermore, it will be understood that the conceptual representation of FIG. 2 is not meant to imply any particular memory organizational model, and that system 100 might employ a single address space virtual memory, or might employ multiple virtual address spaces which overlap.

Figure 3:
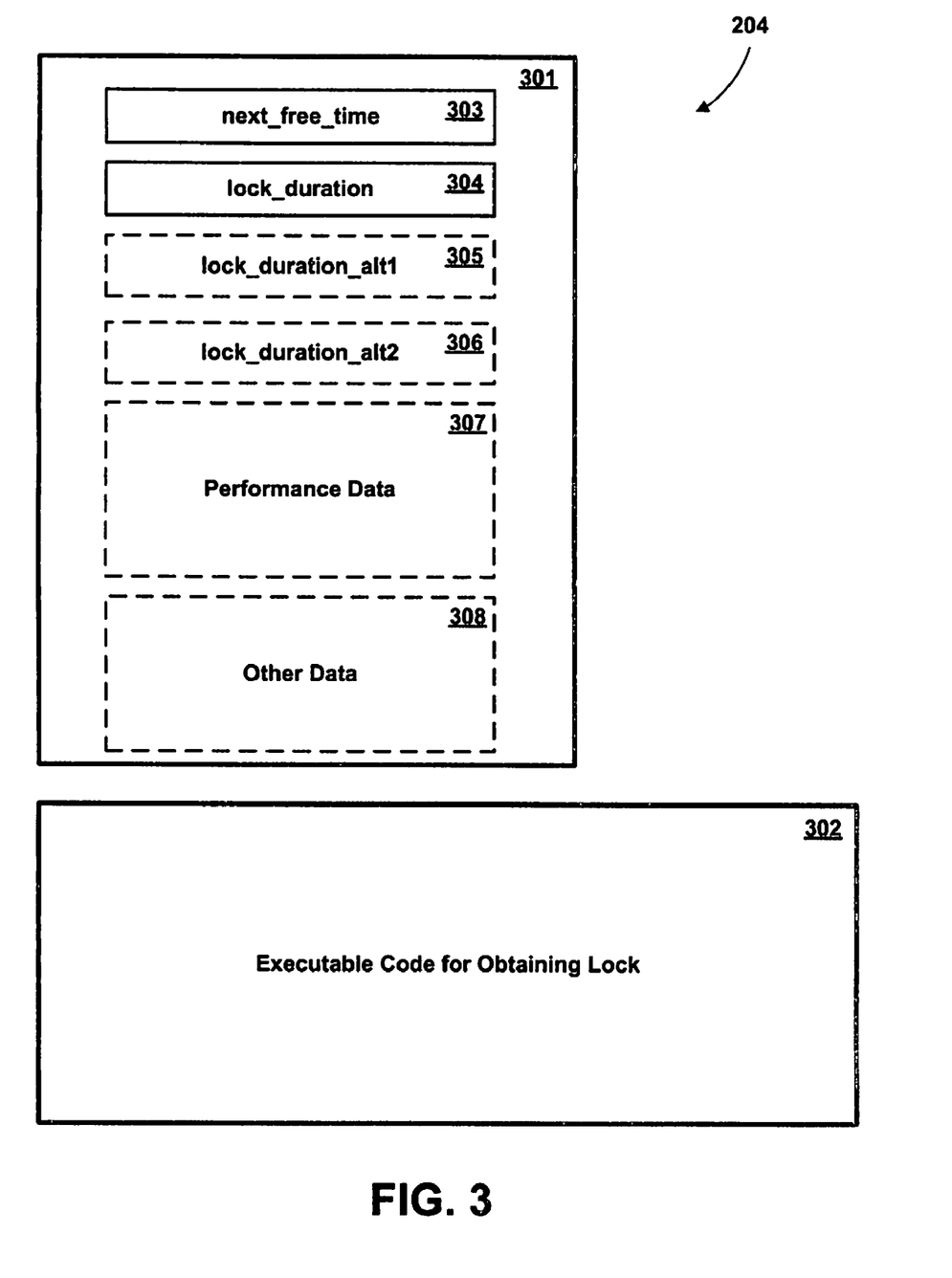
FIG. 3 is a conceptual representation of a soft lock software entity 204, according to the preferred embodiment.

FIG. 3 is a conceptual representation of a soft lock software entity 204, according to the preferred embodiment. Soft lock 204 comprises a data structure 301 storing soft lock state data and executable code 302 for administering the soft lock. Executable code 302 may be used exclusively for a single soft lock, or it may be used to administer multiple soft locks, each containing its own respective state data 301.

Soft lock state data structure 301 comprises a next_free_time field 303 and a lock_duration field 304. Next_free_time field 303 stores the earliest time at which the soft lock is available to another requesting process. Lock_duration field 304 stores the nominal duration of the soft lock. In operation, next_free_time is incremented each time a soft lock is granted using the lock_duration, as described more fully herein.

Soft lock state data may optionally include any of various additional data, represented as features 305-308. In one variation, soft lock state data may include one or more alternate lock_duration values 305-306 (of which two are represented in FIG. 3). Alternate lock duration values may be employed depending on the system environment or other conditions. For example, it may be known that, when the system is extremely busy, the average time required for the shared resource is longer, and therefore a longer lock_duration value may be appropriate under such circumstances. Performance data 307 may be used to maintain performance statistics regarding the use of the soft lock. For example, in another variation, performance data maintains two counters, one recording the number of times the soft lock is granted and the other recording the number of times the process to which the soft lock was granted failed to finish using the shared resource before expiration of the nominal lock_duration interval. By maintaining such counters, it is possible to determine the proportion of accesses to the shared resource which complete within the nominal lock duration. Such data may be used for dynamically adjusting the lock duration.

Soft lock state data 301 may include any of various additional data, depicted generally as feature 308. For example, such additional data 308 could include access rights or access control lists to the shared resource and/or to the soft lock itself.

Although the soft lock state data 301 is represented in FIG. 3 as a single entity, state data could be arranged in a complex data structure or multiple structures, which are not necessarily contiguous in memory. Executable code 302 may or may not be contiguous with the state data.

The shared resource to which soft lock 204 controls access could be any shared hardware or software resource on system 100 which meets the basic criteria for use of a soft lock, i.e., for which shared access is acceptable (in the sense that it does not compromise security, data integrity, and so forth), but for which shared access is undesirable (for example, because it adversely affects performance). One example of such a shared resource is a low-level operating system function which is dispatched for execution to multiple processors; in such a case, internal processor mechanisms may assure system integrity, but the concurrent execution of multiple instances of such a function may affect performance. Another such example is a segment of code which itself obtains numerous locks (i.e., conventional exclusive locks) for respective shared resources. In such a case, the locks may assure system integrity, but if multiple processes are attempting to invoke the same code segment simultaneously, there will be a lot of contention for the locks and consequent effect on performance.

In accordance with the preferred embodiment of the present invention, when a process wishes to access a shared resource accessed via a soft lock, the soft lock function checks next_free_time field 303. If next_free_time is before the current time, then the soft lock is immediately available and is granted to the requesting process. In this case, next_free_time is incremented to the current time plus the value of lock_duration 304. If next_free_time is after the current time, the requesting process must wait until next_free_time. In this case, next_free_time in incremented by the value of lock_duration 304. It is assumed that no other process will be using the shared resource after next_free_time, and therefore the resource is available exclusively to the requesting process. Similarly, after the interval lock_duration, it is assumed that the requesting process will be done with the shared resource, and it will be available for use exclusively by the next requesting process.

Figure 4:
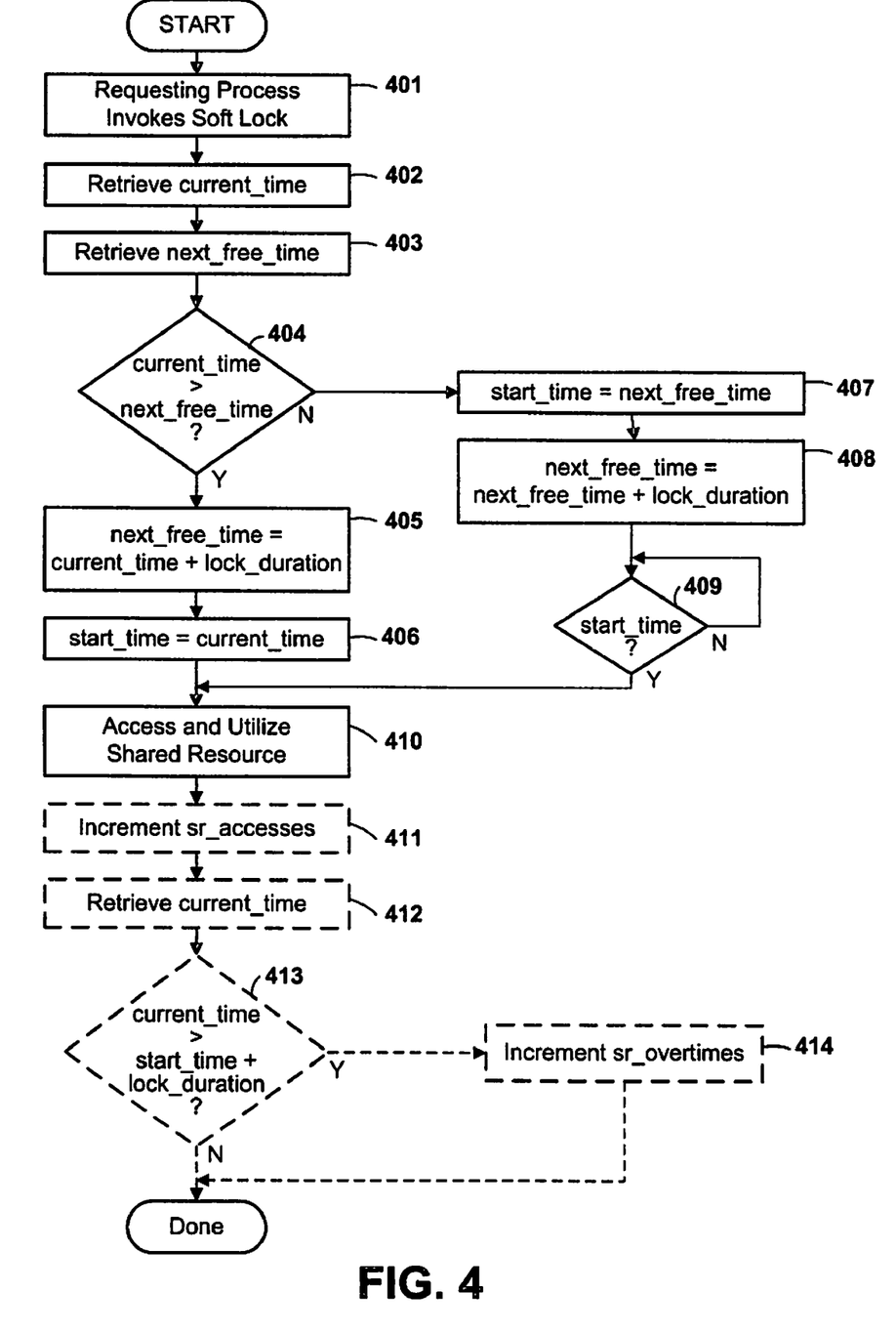
FIG. 4 is a flow diagram showing a process of accessing a shared resource using a soft lock, according to the preferred embodiment.

FIG. 4 is a flow diagram showing a process of accessing a shared resource using a soft lock, according to the preferred embodiment. Referring to FIG. 4, a process requiring access to a shared resource invokes the soft lock function (step 401). The soft lock retrieves the current system time using any available mechanism designed for that purpose (step 402), and also retrieves the next_free_time 303 from the soft lock state data 301 (step 403).

Current time is then compared with next_free_time (step 404). If the current time is later than next_free_time, then the soft lock is available immediately. In this case, the 'Y' branch is taken from step 404, and next_free_time is updated to the current time plus the value of lock_duration 304 (step 405). The updated value of next_free_time is the time at which the soft lock will be available to another process. The current time is optionally saved as start_time, indicating when the process obtained access to the shared resource (step 406). The soft lock function then allows the requesting process to access the shared resource (step 410).

If, at step 404, the current time is less than next_free_time, then the requesting process must wait until next_free_time. In this case, the 'N' branch is taken from step 404, and the current value of next_free_time is saved as start_time (step 407). Next_free_time is then incremented by the value of lock_duration (step 408). The value of next_free_time as incremented is the time at which the soft lock will be available to another process. The soft lock function then waits until start time is reached, shown as the tight loop at step 409. In the preferred embodiment, step 409 represents idling as a spin lock; however, if relatively long lock durations are involved, it would alternatively be possible to swap out the requesting process. The condition expressed in step 409 could be determined by any appropriate means, e.g., a timer may be set initially to the value of start_time−current time, and upon expiration of the timer the 'Y' branch is taken. However determined, upon taking the 'Y' branch from step 409, the requesting process is allowed to access the shared resource (step 410).

Since the state variable next_free_time is necessarily shared, the value of this state variable could become corrupted if multiple processes are allowed to execute the procedure represented by steps 402-408 concurrently. The probability or frequency of a corrupted next_free_time value can be reduced by making steps 405 and 408 atomic operations, but can only be eliminated entirely if the entire sequence of steps 402-408 is an atomic sequence which has exclusive access to next_free_time. Any of various mechanisms might be used to assure exclusive access. However, it will be observed that, just as the shared resource controlled by the soft lock can tolerate occasional concurrent access, the soft lock can tolerate occasional corruption of next_free_time. If the value of next_free_time becomes corrupted, i.e., by failing to increment the value, there is some possibility that multiple processes will access the shared resource, which may temporarily affect performance. At some point, a process requests access to the shared resource at a time when there are no pending accesses to the shared resource, causing next_free_time to resynchronize itself by taking the path through steps 404, 405 and 406.

In the preferred embodiment, no action is required to release the soft lock after the requesting process has finished using the shared resource. However, it may be desirable to collect statistical data concerning use of the shared resource, particularly for purposes of adjusting the value of lock_duration 304. A simple form of statistical data collection is represented in FIG. 4 as optional steps 411-414.

As shown in FIG. 4, upon completion of use of the shared resource, the soft lock optionally updates statistical information in the form of two counters, sr_accesses and sr_overtimes, which represent, respectively, the number of times the shared resource is accessed, and the number of times the access to the shared resource required longer than lock_duration to complete. Sr_accesses is incremented by one to reflect the access to the shared resource just completed (step 411). The current time is then fetched (step 412). If the current time is greater than start_time+lock_duration, the 'Y' branch is taken from step 413, and sr_overtimes is incremented by one (step 414).

Although a particular simple form of statistical data collection is represented in FIG. 4, it will be appreciated that other or additional statistics concerning the performance of the shared resource and its associated soft lock could be collected, and that these might be collected at the conclusion of each access to the shared resource, as represented in FIG. 4, or might be collected at other times.

In one variation of the preferred embodiment, lock_duration is periodically adjusted using the statistical data collected. Preferably, this is performed by a separate asynchronous process which can be triggered by any of various events, such as the elapse of time, a change in system configuration, detection of a performance anomaly, etc.

Figure 5:
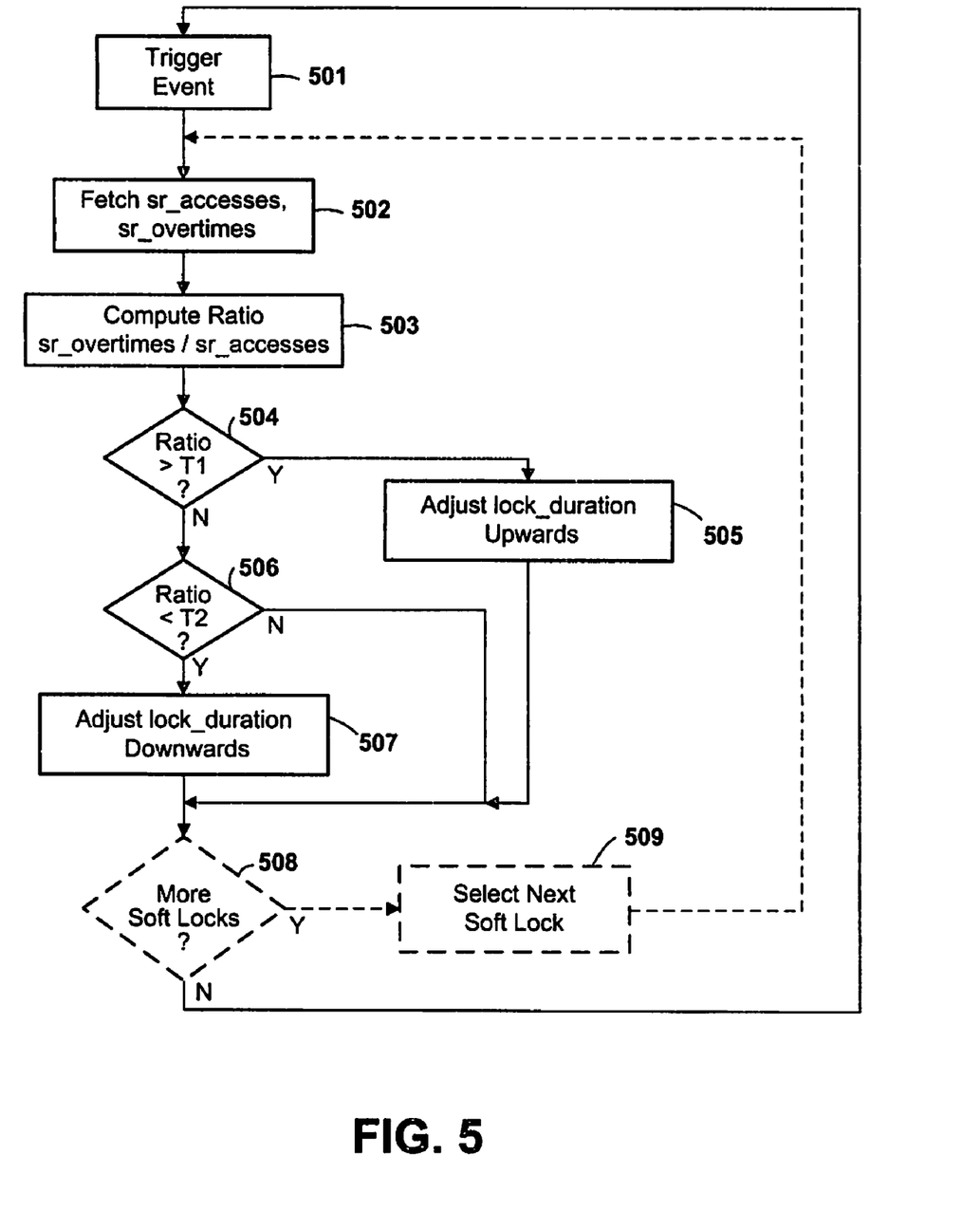
FIG. 5 is a flow diagram showing a process for adjusting a lock interval, according to a variation of the preferred embodiment.

FIG. 5 is a flow diagram representing the operation of an asynchronous process for adjusting lock_duration, in accordance with this variation of the preferred embodiment. As represented in step 501, the process is triggered by a triggering event, such as one described above or some other triggering event. Upon triggering, the process fetches the sr_accesses counter and the sr_overtimes counter (step 502). The sr_overtimes is divided by the sr_accesses to determine a ratio (step 503). If the ratio exceeds a first threshold T1 (the 'Y' branch from step 504), then too many accesses to the shared resource are exceeding the allotted lock_duration. In this case, lock_duration is adjusted upwards (step 505). Lock_duration may be adjusted upward by a fixed increment, or by a fixed percentage, or by a variable amount which depends on the amount by which the ratio of sr_overtimes to sr_acce3sses exceeds T1, or by an adjustment determined in some other manner.

If threshold T1 is not exceeded (the 'N' branch from step 504), then the ratio of sr_overtimes to sr_accesses is compared to a second threshold T2. If the ratio is less than the second threshold (the 'Y' branch from step 506), then too few accesses are exceeding the allotted lock_duration, indicating that the lock_duration may be too long. In this case, lock_duration is adjusted downwards (step 507). As in the case of upward adjustment, lock duration may be adjusted downward by a fixed increment, a fixed percentage, a variable amount which depends on the ratio of sr_overtimes to sr_accesses, or in some other manner.

If there are multiple soft locks in system 100 each having its own respective lock_duration, then a lock duration adjustment process might adjust all lock_duration variables, as shown by optional steps 508 and 509. If more soft locks remain to be adjusted, the 'Y' branch is taken from step 508, the next soft lock is selected (step 509), and steps 502-507 are repeated for the next selected soft lock. When all applicable soft locks have been adjusted, the adjustment process becomes inactive and awaits the next trigger event.

Although a particular form of incremental lock_duration adjustment is disclosed herein, it will be understood that lock_duration could be adjusted based on any number of other formulae or techniques.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network, including a wireless network. Examples of signal-bearing media are illustrated in FIG. 1 as system memory 102, and as data storage devices 125-127.

Although a specific embodiment of the invention has been disclosed along with certain alternatives, it will be recognized by those skilled in the art that additional variations in form and detail may be made within the scope of the following claims.

What is claimed is:

1. A method for controlling access to a shared resource in a computer system in which a plurality of processes are concurrently active, comprising the computer-executed steps of:

maintaining a state variable designating a time at which access to said shared resource is next available, said time at which access to said shared resource is next available representing the expiration of an interval of a first pre-determined duration since any of said concurrently active processes was last granted access to said shared resource, said first pre-determined duration specifying a time interval assumed to be sufficient for most processes to finish using the shared resource;

requesting access to said shared resource by a first process of said plurality of processes, wherein each process of said plurality of processes granted access to said shared resource is granted access for a continuous time interval until the respective process is finished utilizing said shared resource, and wherein, with respect to at least some processes granted access to said shared resource, the respective process is not guaranteed to finish utilization of said shared resource within a respective time interval having said first pre-determined duration and beginning at the time the respective process was granted access to said shared resource;

responsive to said requesting access step to said shared resource by said first process of said plurality processes, (a) if the value of said state variable is earlier than a current time, then allowing immediate access by said first process to said shared resource without regard to whether a process previously granted access to said shared resource has finished utilizing said shared resource; and (b) if the value of said state variable is later than said current time, then waiting the time designated by said state variable, and allowing access by said first process to said shared resource at said time designated by said state variable without regard to whether a process previously granted access to said shared resource has finished utilizing said shared resource.

2. The method for controlling access to a shared resource of claim 1, wherein said step of maintaining a state variable designating a time comprises the steps of:

(a) if said step of allowing access comprises allowing immediate access because the value of said state variable is earlier than said current time, then adjusting said state variable to said current time plus said first pre-determined duration; and (b) if said step of allowing access comprises waiting until the time designated by said state variable because the value of said state variable is later than said current time, then adjusting said state variable by incrementing said state variable by said first pre-determined duration.

3. The method for controlling access to a shared resource of claim 1, wherein said state variable is shared by a plurality of processors, and said step of maintaining a state variable designating a time comprises obtaining exclusive access to said state variable by a single processor to adjust the value of said state variable.

4. The method for controlling access to a shared resource of claim 1, further comprising the step of:

dynamically adjusting the value of said first pre-determined duration.

5. The method for controlling access to a shared resource of claim 4, wherein said step of dynamically adjusting the value of said first pre-determined duration comprises:

determining a proportion of accesses to said shared resource which require longer than said first pre-determined duration to complete; and dynamically adjusting the value of said first pre-determined duration depending on said proportion of accesses to said shared resource which required longer than said first pre-determined duration to complete.

6. The method for controlling access to a shared resource of claim 5, wherein said step of dynamically adjusting the value of said first pre-determined duration depending on said proportion of accesses to said shared resource which required longer than said first pre-determined duration to complete comprises:

(a) incrementing the value of said first pre-determined duration if said proportion of accesses exceeds a first pre-determined threshold; and (b) decrementing the value of said first pre-determined duration if said proportion of accesses is less than a second pre-determined threshold.

7. A computer program product which controls access to a shared resource in a computer system supporting a plurality of concurrently active processes, comprising:

a plurality of executable instructions recorded on non-transitory computer readable media, wherein said instructions, when executed by a digital computing device, cause the device to perform the steps of:

maintaining a state variable designating a time at which access to said shared resource is next available to a process of said plurality of concurrently active processes which does not already have access to said shared resource, said time at which access to said shared resource is next available representing the expiration of an interval of pre-determined lock duration since any of said concurrently active processes was last granted access to said shared resource, said pre-determined lock duration specifying a time interval sufficient for most processes to finish using the shared resource, wherein each process of said plurality of concurrently active processes granted access to said shared resource, is granted access for a continuous time interval until the respective process is finished utilizing said shared resource, and wherein, with respect to at least some processes granted access to said shared resource, the respective process is not guaranteed to finish utilization of said shared resource within a respective interval having said pre-determined lock duration and beginning at the time the respective process was granted access to said shared resource;

responsive to an attempt to access said shared resource by a first process of said plurality of concurrently active processes, (a) if the value of said state variable is earlier than a current time, then allowing immediate access by said first process to said shared resource without regard to whether a process previously granted access to said shared resource has finished utilizing said shared resource; and (b) if the value of said state variable is later than said current time, then waiting the time designated by said state variable, and allowing access by said first process to said shared resource at said time designated by said state variable without regard to whether a process previously granted access to said shared resource has finished utilizing said shared resource.

8. The computer program product of claim 7, wherein said step of maintaining a state variable designating a time comprises the steps of:

(a) if said step of allowing access comprises allowing immediate access because the value of said state variable is earlier than said current time, then adjusting said state variable to said current time plus said pre-determined lock duration; and (b) if said step of allowing access comprises waiting until the time designated by said state variable because the value of said state variable is later than said current time, then adjusting said state variable by incrementing said state variable by said pre-determined lock duration.

9. The computer program product of claim 8, wherein said plurality of executable instructions further cause the device to perform the step of:

dynamically adjusting said pre-determined lock duration.

10. The computer program product of claim 9, wherein said step of dynamically adjusting said pre-determined lock duration comprises:

determining a proportion of accesses to said shared resource which require longer than said pre-determined lock duration to complete; and dynamically adjusting said pre-determined lock duration depending on said proportion of accesses to said shared resource which required longer than said pre-determined lock duration to complete.

11. The computer program product of claim 10, wherein said step of dynamically adjusting said pre-determined lock duration depending on said proportion of accesses to said shared resource which required longer than said pre-determined lock duration to complete comprises:

(a) incrementing said pre-determined lock duration if said proportion of accesses exceeds a first pre-determined threshold; and (b) decrementing said pre-determined lock duration if said proportion of accesses is less than a second pre-determined threshold.

12. The computer program product of claim 7, wherein said state variable is shared by a plurality of processors, and said step of maintaining a state variable designating a time comprises obtaining exclusive access to said state variable by a single processor to adjust the value of said state variable.

13. A computer system, comprising:
at least one processor;
a memory addressable by said at least one processor;
a shared resource;
an access control mechanism for controlling access to said shared resource by a plurality of concurrently active processes executing on said at least one processor, said access control mechanism maintaining a state variable designating a time at which access to said shared resource is next available, said time at which access to said shared resource is next available representing the expiration of an interval of a pre-determined lock duration since any of said concurrently active processes was last granted access to said shared resource, said pre-determined lock duration specifying a time interval assumed to be sufficient for most processes to finish using the shared resource,
wherein each process granted access to said shared resource is granted access for a continuous time interval until the respective process is finished utilizing said shared resource, and wherein, with respect to at least some processes granted access to said shared resource, the respective process is not guaranteed to finish utilization of said shared resource within a respective time interval having said pre-determined lock duration and beginning at the time the respective process was granted access to said shared resource,
wherein, responsive to an attempt to access said shared resource by a first process of said plurality of concurrently active processes,
(a) if the value of said state variable is earlier than a current time, said access control mechanism grants immediate access by said first process to said shared resource without regard to whether a process previously granted access to said shared resource has finished utilizing said shared resource; and
(b) if the value of said state variable is later than said current time, said access control mechanism waits the time designated by said state variable, and grants access by said first process to said shared resource at said time designated by said state variable without regard to whether a process previously granted access to said shared resource has finished utilizing said shared resource.

14. The computer system of claim 13, wherein said computer system comprises a plurality of processors for executing said plurality of concurrently active processes, said access control mechanism being shared by said plurality of processors.

15. The computer system of claim 13, wherein said access control mechanism further comprises:
a dynamic adjustment function which automatically adjusts said pre-determined lock duration.

16. The computer system of claim 13, wherein said access control mechanism comprises:
a state variable maintenance function which, responsive to a request to access said shared resource, adjusts said state variable by an amount dependent on said pre-determined lock duration.

17. The computer system of claim 16, wherein:
(i) if said access control mechanism allows immediate access because the value of said state variable is earlier than said current time, then said state variable maintenance function adjusts said state variable to said current time plus said pre-determined lock duration; and
(b) if said access control mechanism allows access at the time designated by said state variable because the value of said state variable is later than said current time, then said state variable maintenance function adjusts said state variable by incrementing said state variable by said pre-determined lock duration.

* * * * *